United States Patent
Ouyang

(10) Patent No.: US 10,186,975 B2
(45) Date of Patent: Jan. 22, 2019

(54) RESONANT CONVERTER WITH ADAPTIVE ON-TIME CONTROL AND THE METHOD THEREOF

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 0 days.

(21) Appl. No.: 15/898,198

(22) Filed: Feb. 15, 2018

(65) Prior Publication Data

US 2018/0262119 A1 Sep. 13, 2018

(30) Foreign Application Priority Data

Mar. 13, 2017 (CN) .......................... 2017 1 0144658

(51) Int. Cl.
   *H02M 3/335* (2006.01)
   *H02M 1/08* (2006.01)

(52) U.S. Cl.
   CPC ......... *H02M 3/33576* (2013.01); *H02M 1/08* (2013.01)

(58) Field of Classification Search
   CPC . H02M 2001/0025; H02M 2007/4815; H02M 2007/4818
   USPC .............. 323/241, 274, 283, 284; 363/21.01, 363/21.02, 21.06, 21.1, 21.11, 78
   See application file for complete search history.

(56) References Cited

U.S. PATENT DOCUMENTS

| 8,400,129 | B2 | 3/2013 | Ouyang | |
|---|---|---|---|---|
| 9,379,630 | B2 | 6/2016 | Miao | |
| 9,685,876 | B2 | 6/2017 | Liu et al. | |
| 9,812,975 | B2 | 11/2017 | Chen | |
| 9,893,635 | B2 | 2/2018 | Lin | |
| 2010/0181983 | A1* | 7/2010 | Ouyang | H02M 3/156 323/283 |
| 2010/0265742 | A1* | 10/2010 | Hu | H02M 3/33507 363/21.13 |
| 2014/0029316 | A1* | 1/2014 | Adragna | H02M 3/33523 363/21.18 |
| 2014/0376272 | A1* | 12/2014 | Miao | H02M 3/33592 363/21.02 |

OTHER PUBLICATIONS

U.S. Appl. No. 15/665,354, filed Jul. 31, 2017, Chengdu Monolithic Power Systems.
U.S. Appl. No. 15/297,085, filed Oct. 19, 2016, Chengdu Monolithic Power Systems.
U.S. Appl. No. 15/846,137, filed Dec. 18, 2017, Hangzhou MPS Semiconductor Technology Ltd.

\* cited by examiner

*Primary Examiner* — Gary Nash
(74) *Attorney, Agent, or Firm* — Perkins Coie LLP

(57) ABSTRACT

A resonant converter adopts adaptive on-time control to provide better transient response. When the output voltage of the resonant converter varies, the on-time length of a power switch in power stages is adjusted, so that the switching frequency and the gain are regulated and optimized.

20 Claims, 6 Drawing Sheets

RESONANT CONVERTER WITH ADAPTIVE ON-TIME CONTROL AND THE METHOD THEREOF

CROSS-REFERENCE TO RELATED APPLICATIONS

This application claims priority to and the benefit of Chinese Patent Application No. 201710144658.3, filed Mar. 13, 2017, which is incorporated herein by reference in its entirety.

FIELD

The present invention relates to electronic circuits, more specifically, the present invention relates to resonant converter.

BACKGROUND

Prior resonant converter adopts a voltage-controlled oscillator. A compensation signal is generated from an output voltage of the converter by way of an operational amplifier (or an error amplifier) to regulate the voltage-controlled oscillator, so as to control the switching frequency of the resonant converter. FIG. 1 shows the gain of the resonant converter versus the switching frequency. Typically, the resonant converter operates at the right half region of the critical frequency f0. Thus, the higher the switching frequency is, the lower the gain is.

However, resonant converters with above voltage-controlled oscillation control scheme have poor transient response. Moreover, pulse skipping mode (PSM) is used when the converter is in light load condition in order to improve the efficiency. But the transition between PSM and fixed frequency mode is not smooth, which affects the efficiency and further weakens the transient response.

SUMMARY

It is an object of the present invention to provide an improved resonant converter, which solves the above problems.

In accomplishing the above and other objects, there has been provided, in accordance with an embodiment of the present invention, a resonant converter, comprising: an input power stage including a first power switch and a second power switch, configured to receive an input voltage; an output power stage, coupled to the input power stage by way of a resonant net and a transformer, the output power stage configured to generate an output voltage; and a control circuit, configured to control the input power stage and the output power stage, the control circuit comprising: a comparison circuit, configured to generate a comparison signal in response to a voltage feedback signal indicative of the output voltage and a voltage reference signal, the comparison signal having a rising edge and a falling edge; a logical circuit, configured to generate a pulse width signal in response to the comparison signal and an on-time signal, the pulse width signal having a rising edge and a falling edge; and an on-time controller, configured to generate the on-time signal in response to the comparison signal and the pulse width signal, the on-time signal operable to decrease when the whole of the rising edge of the comparison signal is later than the whole of the falling edge of the pulse width signal, and to increase when the whole of the rising edge of the comparison signal is earlier than the whole of the falling edge of the pulse width signal.

In addition, there has been provided, in accordance with an embodiment of the present invention, a control circuit used in a resonant converter, the resonant converter including an input power stage and an output power stage, the output power stage configured to generate an output voltage, the control circuit comprising: a comparison circuit, configured to generate a comparison signal in response to a voltage feedback signal indicative of the output voltage and a voltage reference signal, the comparison signal having a rising edge and a falling edge; a logical circuit, configured to generate a pulse width signal in response to the comparison signal and an on-time signal, the pulse width signal having a rising edge and a falling edge; and an on-time controller, configured to generate the on-time signal in response to the comparison signal and the pulse width signal, the on-time signal operable to decrease when the whole of the rising edge of the comparison signal is later than the whole of the falling edge of the pulse width signal, and to increase when the whole of the rising edge of the comparison signal is earlier than the whole of the falling edge of the pulse width signal.

Furthermore, there has been provided, in accordance with an embodiment of the present invention, a method used in a resonant converter, the resonant converter including an input power stage and an output power stage, the input power stage having a first power switch and a second power switch, the method comprising: generating a voltage feedback signal by feeding an output voltage provided by the output power stage; generating a comparison signal by comparing the voltage feedback signal with a voltage reference signal, the comparison signal having a rising edge and a falling edge; generating a pulse width signal in response to the comparison signal and an on-time signal, the pulse width signal having a rising edge and a falling edge; and generate the on-time signal in response to the pulse width signal and the comparison signal, wherein the on-time signal increases if the whole of the rising edge of the comparison signal is earlier than the whole of the falling edge of the pulse width signal, and decreases if the whole of the rising edge of the comparison signal is later than the whole of the falling edge of the pulse width signal.

The use of the similar reference label in different drawings indicates the same of like components.

DETAILED DESCRIPTION

Embodiments of circuits for resonant converter with adaptive on-time control are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
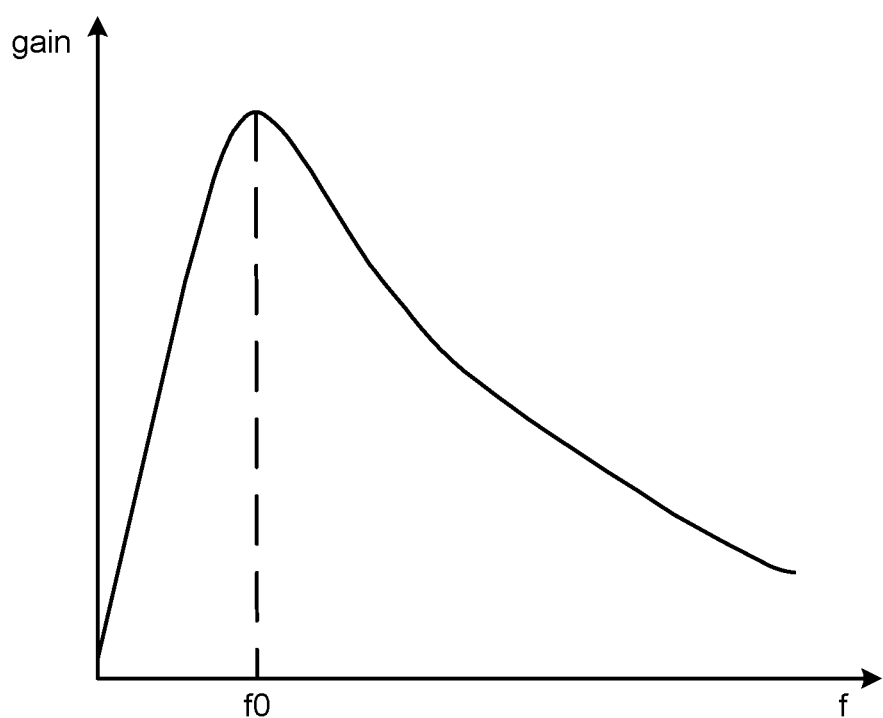
FIG. 1 shows the gain of the prior art resonant converter versus the switching frequency.
Figure 2:
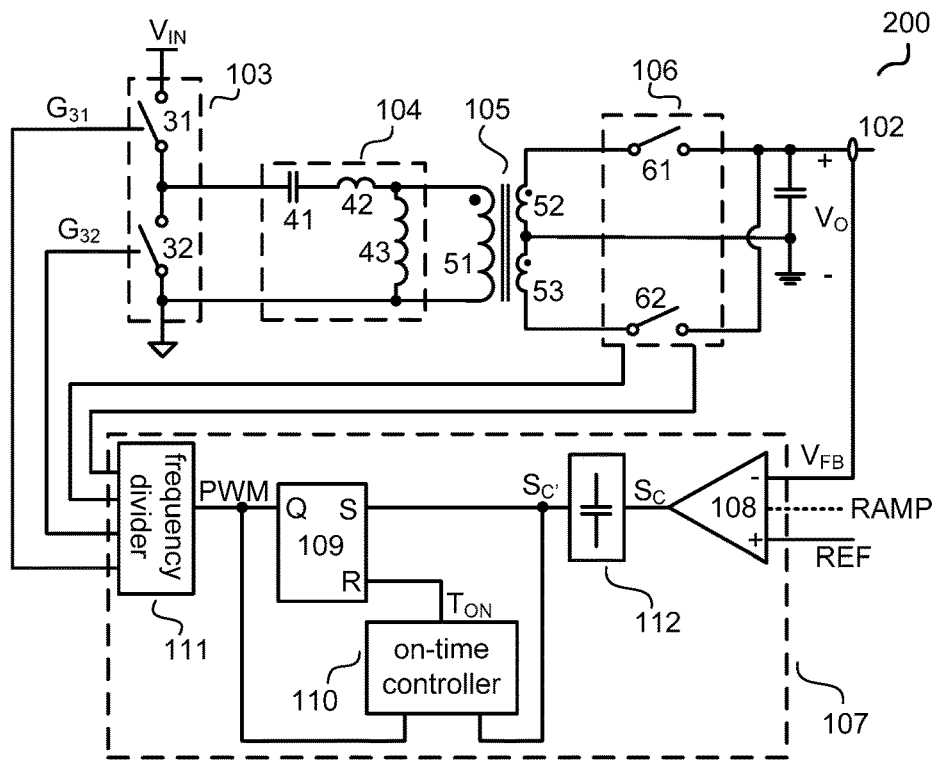
FIG. 2 schematically shows a resonant converter 200 in accordance with an embodiment of the present invention.

FIG. 2 schematically shows a resonant converter 200 in accordance with an embodiment of the present invention. In the example of FIG. 2, the resonant converter 200 comprises: an input power stage 103, coupled to an input port to receive an input voltage VIN; a resonant net 104, a transformer 105 and an output power stage 106, coupled between the input power stage 103 and an output port 102, to generate a regulated output voltage VO to power a load; a control circuit 107, configured to control the input power stage 103 and the output power stage 106, the control circuit 107 comprising: a comparison circuit 108, configured to generate a comparison signal SC in response to a voltage feedback signal VFB indicative of the output voltage VO and a voltage reference signal REF, the comparison signal SC having a rising edge and a falling edge; a logical circuit 109, configured to generate a pulse width signal PWM in response to the comparison signal SC and an on-time signal TON, the pulse width signal PWM having a rising edge and a falling edge; and an on-time controller 110, configured to generate the on-time signal TON in response to the comparison signal SC and the pulse width signal PWM, wherein the on-time signal TON is operable to decrease when the whole of the rising edge of the comparison signal SC is later than the whole of the falling edge of the pulse width signal PWM in a switching cycle, and to increase when the whole of the rising edge of the comparison signal SC is earlier than the whole of the falling edge of the pulse width signal PWM in a switching cycle.

In one embodiment, the on-time signal TON comprises a square wave signal, i.e., the on-time signal TON has high level and low level. When the whole of the rising edge of the comparison signal SC is later than the whole of the falling edge of the pulse width signal PWM in a switching cycle; the high level time length of the on-time signal TON is shortened by a certain value, and when the whole of the rising edge of the comparison signal SC is earlier than the whole of the falling edge of the pulse width signal PWM in a switching cycle, the high level time length of the on-time signal TON is prolonged by a certain value.

In the example of FIG. 2, the control circuit 107 further comprises: a frequency divider 111, configured to generate two control signals (e.g., a first control signal G31 and a second control signal G32) in response to the pulse width signal PWM, to control the operations of the input power stage 103 and the output power stage 106.

In the example of FIG. 2, the input power stage 103 includes a first power switch 31 and a second power switch 32 coupled in series between the input port and a primary reference ground; a switch voltage is generated at a conjunction node of the first power switch 31 and the second power switch 32. The resonant net 104 is configured to receive the switch voltage to generate a resonant voltage. The transformer 105 comprises: a primary winding 51, a first secondary winding 52, and a second secondary winding 53, the primary winding 51 being coupled to the resonant net 104. The output power stage 106 includes: a first synchronous power switch 61, coupled between the transformer 105 (the first secondary winding 52) and the output port 102; and a second synchronous power switch 62, coupled between the transformer 105 (the second secondary winding 52) and the output port 102. The first synchronous power switch 61 has a same conduction (ON/OFF) state as the first power switch 31, and the second synchronous power switch 62 has a same conduction (ON/OFF) state as the second power switch 32. That is, the first synchronous power switch 61 is controlled to be ON and OFF simultaneously as the first power switch 31; and the second synchronous power switch 62 is controlled to be ON and OFF simultaneously as the second power switch 32.

In one embodiment, the pulse width signal PWM is reset in response to the on-time signal TON and is set in response to the comparison signal SC. In particular, the pulse width signal PWM is set when the voltage feedback signal VFB is lower than the voltage reference signal REF, and is reset when the on-time controller 110 times over.

In one embodiment, the comparison circuit 108 is further configured to receive a ramp signal RAMP (shown as a dash line in FIG. 2). The comparison circuit 108 is configure to generate the comparison signal SC by comparing a sum of the voltage feedback signal VFB and the ramp signal RAMP with the voltage reference signal REF.

In one embodiment, the on-time signal TON has a high level length longer than a minimum length TON_Min and shorter than a maximum length TON_Max. That is, the on-time controller 110 limits the maximum value and the minimum value of the on-time signal TON.

In one embodiment, the input voltage VIN comprises a 48V voltage signal provided by a front stage; and the output voltage VO is regulated to be 12V or 6V. The first power switch 31 and the second power switch 32 are controlled to be ON and OFF complementary. They have a same on time in each switching cycle. That is, each of the power switches has the duty cycle of 50%.

In the example of FIG. 2, the input power stage 103 includes the first power switch 31 and the second power switch 32, which is configured as a half bridge. However, one skilled in the art should realize that, the input power stage can also be configured as a full bridge.

In one embodiment, the primary side and the secondary side may be not common-grounded, i.e., they may not have the same ground. Thus, electric isolation is needed when signals generated at the secondary side is delivered to the primary side. FIG. 2 schematically shows such electric isolation. In the example of FIG. 2, the resonant converter 200 further comprises an isolation circuit 112, configured to convert the comparison signal SC having the same ground as the secondary side into a signal SC' having the same ground as the primary side, which is then delivered to the logical circuit 109 and the on-time controller 110. In one embodiment, the isolation circuit 112 comprises a capacitor. But one skilled in the art should realize that the primary side and the secondary side may refer to a same ground (i.e. they may be common-grounded). Then signals generated at the secondary side may be delivered to the primary side directly without isolation.

Figure 3:
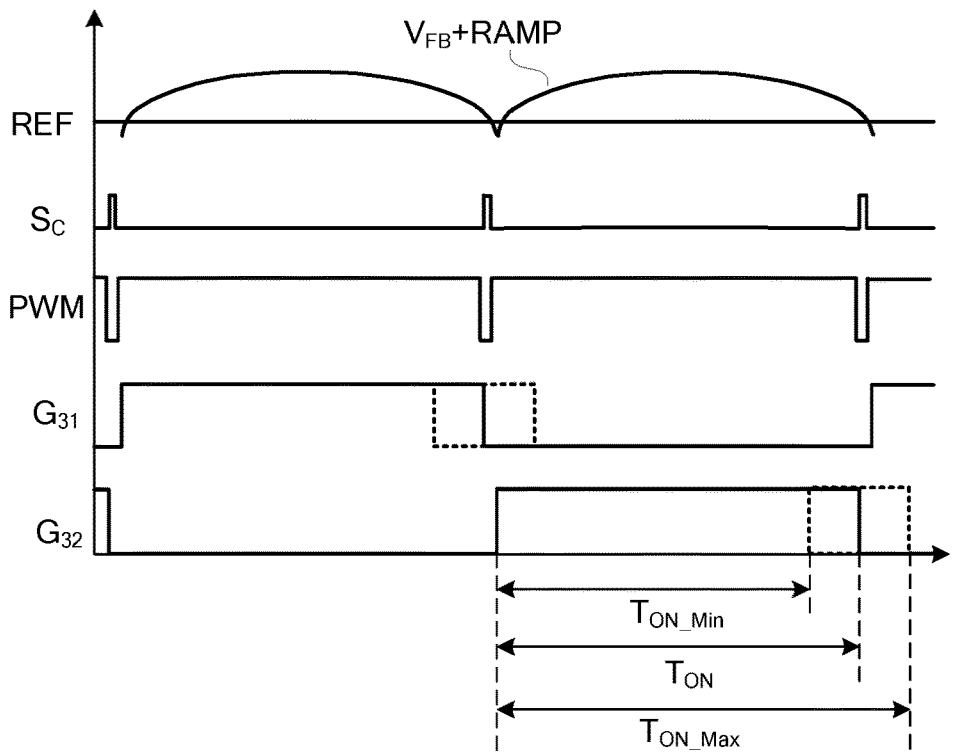
FIG. 3 schematically shows timing waveforms of the sum of the voltage feedback signal VFB and the ramp signal RAMP, the voltage reference signal REF, the comparison signal SC, the pulse width signal PWM, the first control signal G31, and the second control signal G32 in the resonant converter in FIG. 2 in accordance with an embodiment of the present invention.

FIG. 3 schematically shows timing waveforms of the sum of the voltage feedback signal VFB and the ramp signal RAMP, the voltage reference signal REF, the comparison signal SC, the pulse width signal PWM, the first control signal G31, and the second control signal G32 in the resonant converter in FIG. 2 in accordance with an embodiment of the present invention. As shown in FIG. 3, the comparison signal SC turns to be high when the sum of the voltage feedback signal VFB and the ramp signal RAMP is lower than the voltage reference signal REF. If the output voltage VO is lower than its desired value, the voltage feedback signal VFB (or the sum of the voltage feedback signal VFB and the ramp signal RAMP) will falls to the voltage reference signal REF earlier. Thus at the rising edge of the comparison signal SC, the falling edge of the pulse width signal PWM has not come yet, which means that the whole of the rising edge of the comparison signal SC is earlier than the whole of the falling edge of the pulse width signal PWM, the on-time signal TON will increase, and the ON time of the power switch (31 or 32) will be prolonged by a certain value in the next switching cycle. Accordingly, the switching frequency decreases, the gain increases, and the output voltage will increase. On the contrary, If the output voltage VO is higher than its desired value, the voltage feedback signal VFB (or the sum of the voltage feedback signal VFB and the ramp signal RAMP) will falls to the voltage reference signal REF later. Thus at the rising edge of the comparison signal SC, the falling edge of the pulse width signal PWM has already come, which means that the whole of the rising edge of the comparison signal SC is later than the whole of the falling edge of the pulse width signal PWM, the on-time signal TON will decrease, and the ON time of the power switch (31 or 32) will be shortened by a certain value in the next switching cycle. Accordingly, the switching frequency increases, the gain decreases, and the output voltage will decrease. As a result, the resonant converter 200 in FIG. 2 has good transient response. It regulates the output voltage to desired value quickly.

Moreover, as shown in FIG. 3, the on-time signal TON is limited to be between the minimum length TON_Min and the maximum length TON_Max.

Figure 4:
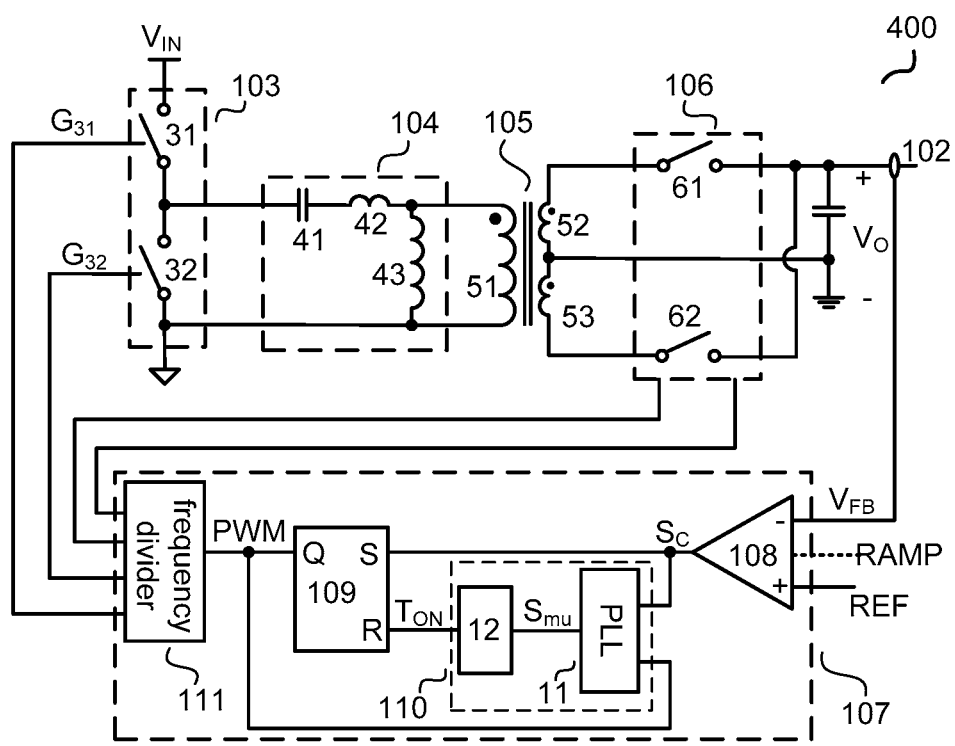
FIG. 4 schematically shows a resonant converter 400 with an on-time controller 110 in accordance with an embodiment of the present invention.

FIG. 4 schematically shows a resonant converter 400 with an on-time controller 110 in accordance with an embodiment of the present invention. Particularly, in the example of FIG. 4, the on-time controller 110 comprises: a phase locked loop (PLL) circuit 11, configured to receive the comparison signal SC and the pulse width signal PWM, wherein the PLL circuit 11 is configured to lock the phases of the rising edge of the comparison signal SC and the falling edge of the pulse width signal PWM to generate a modulated signal SMU; and a timer 12, configure to receive the modulated signal SMU to generate the on-time signal TON. The on-time signal TON decreases (e.g. shortens its high level length) when the whole of the rising edge of the comparison signal SC is later than the whole of the falling edge of the pulse width signal PWM and increases (e.g. prolongs its high level length) when the whole of the rising edge of the comparison signal SC is earlier than the whole of the falling edge of the pulse width signal PWM.

In one embodiment, the timer 12 is configured to add the modulated signal SMU to the current on-time signal TON to generate the update on-time signal. If the whole of the rising edge of the comparison signal SC is later than the falling edge of the pulse width signal PWM in a switching cycle, the modulation signal SMU is negative versus to a reference signal. Accordingly, the on-time signal TON decreases its high level time length. If the whole of the rising edge of the comparison signal SC is earlier than the whole of the falling edge of the pulse width signal PWM in a switching cycle, the modulation signal SMU is positive versus to the reference signal. Accordingly, the on-time signal TON increases its high level time length.

The other circuit configurations and the operation principle of the resonant converter 400 in FIG. 4 are similar to the resonant converter 200 in FIG. 2.

Figure 5:
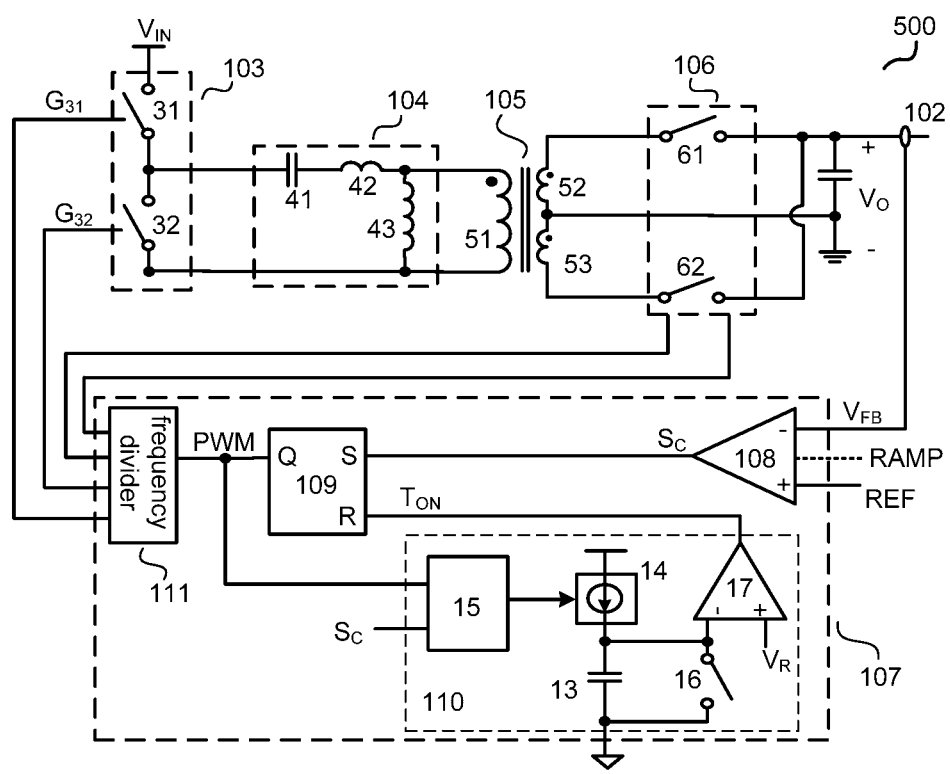
FIG. 5 schematically shows a resonant converter 500 with an on-time controller 110 in accordance with an embodiment of the present invention.

FIG. 5 schematically shows a resonant converter 500 with an on-time controller 110 in accordance with an embodiment of the present invention. Particularly, in the example of FIG. 5, the on-time controller 110 comprises: a charge capacitor 13; a current source unit 14, configured to provide a charge current to the charge capacitor 13, wherein the comparison signal SC and the pulse width signal PWM are configured to control the charge current of the current source unit 14 by way of a logical unit 15; a reset switch 16, coupled in parallel with the charge capacitor 13, when the voltage feedback signal VFB (or the sum of the voltage feedback signal VFB and the ramp signal RAMP) goes lower than the voltage reference signal REF, the reset switch 16 resets the charge capacitor 13; and a comparison unit 17, configured to generate the on-time signal TON in response to a voltage across the charge capacitor 13 and a reference voltage VR. If the whole of the rising edge of the comparison signal SC is earlier than the whole of the falling edge of the pulse width signal PWM in a switching cycle, the charge current provided by the current source unit 14 decreases. If the whole of the rising edge of the comparison signal SC is later than the whole of the falling edge of the pulse width signal PWM in a switching cycle, the charge current provided by the current source unit 14 increases.

The other circuit configurations and the operation principle of the resonant converter 500 in FIG. 5 are similar to the resonant converter 200 in FIG. 2.

Figure 6:
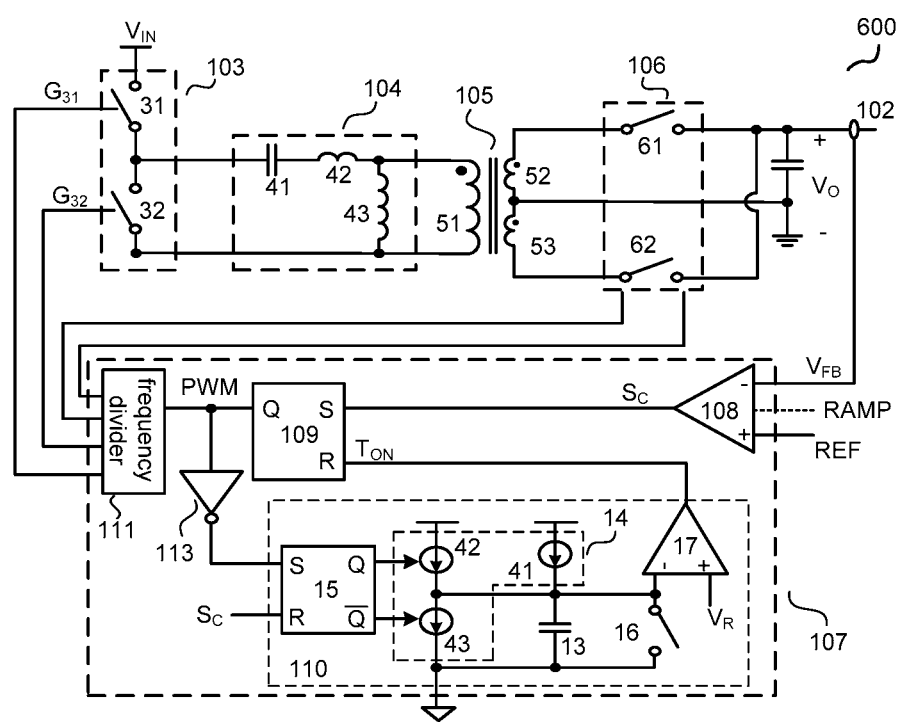
FIG. 6 schematically shows a resonant converter 600 in accordance with an embodiment of the present invention.

FIG. 6 schematically shows a resonant converter 600 in accordance with an embodiment of the present invention. The embodiment of FIG. 6 schematically shows a circuit principle diagram of the on-time controller 110 in accordance with an embodiment of the present invention. In the example of FIG. 6, the current source unit 14 comprises: a first current source 41, configured to provide a first charge current to the charge capacitor 13; a second current source 42, configured to provide a second charge current to the charge capacitor 13 in response to the falling edge of the pulse width signal PWM; a current sink 43, configured to sink the current from the charge capacitor 13 in response to the rising edge of the comparison signal SC. The logical unit 15 comprises: a RS latch, configured to be reset in response to the rising edge of the comparison signal SC, and to be set in response to the falling edge of the pulse width signal PWM, to generate output signals Q and/Q, so as to control the current source unit 14, wherein the second current source 42 starts to charge the charge capacitor 16 in response to the falling edge of the pulse width signal PWM, and the current sink 43 starts to sink the current from the charge capacitor 13 in response to the rising edge of the comparison signal SC.

In one embodiment, the RS latch is trigged by rising edges. Thus, the resonant converter 600 further comprises an inverter 113, coupled between the RS latch and the pulse width signal PWM.

The other circuit configurations and the operation principle of the resonant converter 600 in FIG. 6 are similar to the resonant converter 200 in FIG. 2.

In the examples of FIG. 5 and FIG. 6, the control to the on-time signal TON is achieved by changing the charge current. However, one ordinary skilled in the art should realize that the control to the on-time signal TON can also be achieved by changing the capacitance of the charge capacitor. In addition, either changing the charge current or changing the capacitance of the charge capacitor is an analog approach. One with ordinary skill in the art should realize that digital approaches could also be used to control the on-time signal TON.

Figure 7:
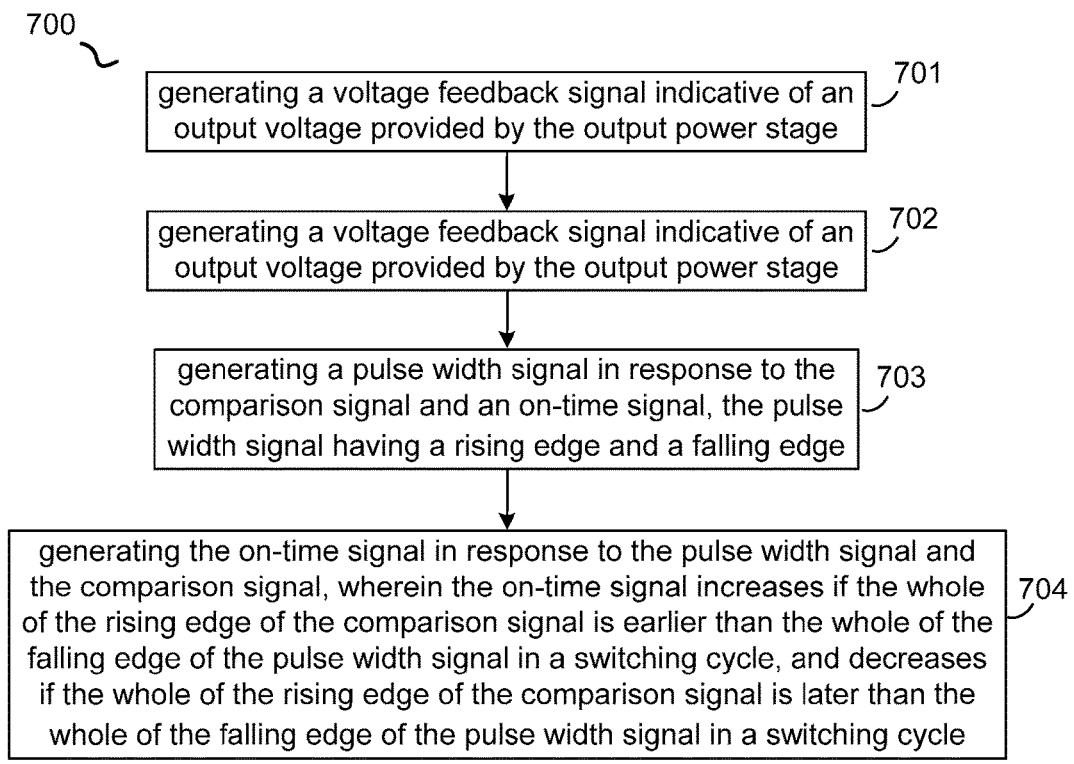
FIG. 7 schematically shows a flowchart 700 of a method used in a resonant converter in accordance with an embodiment of the present invention.

Furthermore, the present invention provides a method used in a resonant converter. FIG. 7 schematically shows a flowchart 700 of a method used in a resonant converter in accordance with an embodiment of the present invention, the resonant converter including an input power stage and an output power stage, the input power stage having a first power switch and a second power switch, the method comprises:

Step 701, generating a voltage feedback signal indicative of an output voltage provided by the output power stage.

Step 702, generating a comparison signal by comparing the voltage feedback signal with a voltage reference signal, the comparison signal having a rising edge and a falling edge.

Step 703, generating a pulse width signal in response to the comparison signal and an on-time signal, the pulse width signal having a rising edge and a falling edge. And Step 704, generating the on-time signal in response to the pulse width signal and the comparison signal, wherein the on-time signal increases if the whole of the rising edge of the comparison signal is earlier than the whole of the falling edge of the pulse width signal in a switching cycle, and decreases if the whole of the rising edge of the comparison signal is later than the whole of the falling edge of the pulse width signal in a switching cycle.

In one embodiment, the method further comprising: generating a first control signal and a second control signal respectively used to control the first power switch and the second power switch in the input power stage by dividing a frequency of the pulse width signal.

In one embodiment, the pulse width signal is set in response to the comparison signal and is reset in response to the on-time signal.

In one embodiment, the step generating the on-time signal in response to the pulse width signal and the comparison signal comprises: locking the rising edge of the comparison signal and the falling edge of the pulse width signal to generate a modulated signal; and adding the modulated signal to the current on-time signal to generate an update on-time signal.

Several embodiments of the foregoing resonant converter and the method thereof provide better transient response compared to conventional technique. Unlike the conventional technique, several embodiments of the foregoing resonant converter adopt adaptive on-time control: when the output voltage varies, the on-time length of the power switch is adjusted to regulate the switching frequency and the gain, so as to improve the transient response. In addition, several embodiments of the foregoing resonant converter use simple circuit. The transition between light load and heavy load is smooth.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A resonant converter, comprising:
   an input power stage including a first power switch and a second power switch, configured to receive an input voltage;
   an output power stage, coupled to the input power stage by way of a resonant net and a transformer, the output power stage configured to generate an output voltage; and
   a control circuit, configured to control the input power stage and the output power stage, the control circuit comprising:
      a comparison circuit, configured to generate a comparison signal in response to a voltage feedback signal indicative of the output voltage and a voltage reference signal, the comparison signal having a rising edge and a falling edge;
      a logical circuit, configured to generate a pulse width signal in response to the comparison signal and an on-time signal, the pulse width signal having a rising edge and a falling edge; and
      an on-time controller, configured to generate the on-time signal in response to the comparison signal and the pulse width signal, the on-time signal operable to decrease when the whole of the rising edge of the comparison signal is later than the whole of the falling edge of the pulse width signal, and to increase when the whole of the rising edge of the comparison signal is earlier than the whole of the falling edge of the pulse width signal.

2. The resonant converter of claim 1, wherein the comparison circuit is further configured to receive a ramp signal, and wherein the comparison circuit is configure to generate the comparison signal by comparing a sum of the voltage feedback signal and the ramp signal with the voltage reference signal.

3. The resonant converter of claim 1, wherein the on-time controller comprises:
   a phase locked loop circuit, configured to receive the comparison signal and the pulse width signal, wherein the phase locked loop circuit is configured to lock the rising edge of the comparison signal and the falling edge of the pulse width signal to generate a modulated signal; and
   a timer, configure to receive the modulated signal to generate the on-time signal.

4. The resonant converter of claim 3, wherein the timer is configured to add the modulated signal to the current on-time signal to generate an update on-time signal.

5. The resonant converter of claim 1, wherein the on-time controller comprises:
   a charge capacitor, coupled in parallel with a reset switch;
   a current source unit, configured to provide a charge current to the charge capacitor, wherein the charge current of the current source unit is controlled by the comparison signal and the pulse width signal by way of a logical unit; and a comparison unit, configured to generate the on-time signal in response to a voltage across the charge capacitor and a reference voltage.

6. The resonant converter of claim 5, wherein:

If the whole of the rising edge of the comparison signal is earlier than the whole of the falling edge of the pulse width signal, the charge current provided by the current source unit decreases; and if the whole of the rising edge of the comparison signal is later than the whole of the falling edge of the pulse width signal, the charge current provided by the current source unit increases.

7. The resonant converter of claim 5, wherein the logical circuit comprises:

a RS latch, configured to be reset in response to the rising edge of the comparison signal, and to be set in response to the falling edge of the pulse width signal, to control the current source unit.

8. The resonant converter of claim 1, wherein the first power switch and the second power switch are controlled to be ON and OFF complementary, with each of the power switches having 50% duty cycle in a switching cycle.

9. The resonant converter of claim 1, further comprising:

a frequency divider, configured to generate a first control signal and a second control signal in response to the pulse width signal, the first power switch and the second power switch being respectively controlled by the first control signal and the second control signal.

10. A control circuit used in a resonant converter, the resonant converter including an input power stage and an output power stage, the output power stage configured to generate an output voltage, the control circuit comprising:

a comparison circuit, configured to generate a comparison signal in response to a voltage feedback signal indicative of the output voltage and a voltage reference signal, the comparison signal having a rising edge and a falling edge;

a logical circuit, configured to generate a pulse width signal in response to the comparison signal and an on-time signal, the pulse width signal having a rising edge and a falling edge; and an on-time controller, configured to generate the on-time signal in response to the comparison signal and the pulse width signal, the on-time signal operable to decrease when the whole of the rising edge of the comparison signal is later than the whole of the falling edge of the pulse width signal, and to increase when the whole of the rising edge of the comparison signal is earlier than the whole of the falling edge of the pulse width signal.

11. The control circuit of claim 10, further comprising:

a frequency divider, configured to generate two control signals in response to the pulse width signal, to control the operations of the input power stage and the output power stage.

12. The control circuit of claim 10, wherein the on-time controller comprises:

a phase locked loop circuit, configured to receive the comparison signal and the pulse width signal, wherein the phase locked loop circuit is configured to lock the rising edge of the comparison signal and the falling edge of the pulse width signal to generate a modulated signal; and a timer, configure to receive the modulated signal to generate the on-time signal.

13. The control circuit of claim 12, wherein the timer is configured to add the modulated signal to the current on-time signal to generate an update on-time signal.

14. The control circuit of claim 10, wherein the on-time controller comprises:

a charge capacitor, coupled in parallel with a reset switch;

a current source unit, configured to provide a charge current to the charge capacitor, wherein the charge current of the current source unit is controlled by the comparison signal and the pulse width signal by way of a logical unit; and a comparison unit, configured to generate the on-time signal in response to a voltage across the charge capacitor and a reference voltage.

15. The control circuit of claim 14, wherein: If the whole of the rising edge of the comparison signal is earlier than the whole of the falling edge of the pulse width signal, the charge current provided by the current source unit decreases; and if the whole of the rising edge of the comparison signal is later than the whole of the falling edge of the pulse width signal, the charge current provided by the current source unit increases.

16. The control circuit of claim 14, wherein the logical circuit comprises:

a RS latch, configured to be reset in response to the rising edge of the comparison signal, and to be set in response to the falling edge of the pulse width signal, to control the current source unit.

17. A method used in a resonant converter, the resonant converter including an input power stage and an output power stage, the input power stage having a first power switch and a second power switch, the method comprising:

generating a voltage feedback signal by feeding an output voltage provided by the output power stage;

generating a comparison signal by comparing the voltage feedback signal with a voltage reference signal, the comparison signal having a rising edge and a falling edge;

generating a pulse width signal in response to the comparison signal and an on-time signal, the pulse width signal having a rising edge and a falling edge; and generate the on-time signal in response to the pulse width signal and the comparison signal, wherein the on-time signal increases if the whole of the rising edge of the comparison signal is earlier than the whole of the falling edge of the pulse width signal, and decreases if the whole of the rising edge of the comparison signal is later than the whole of the falling edge of the pulse width signal.

18. The method of claim 17, further comprising:

generating a first control signal and a second control signal respectively used to control the first power switch and the second power switch by dividing a frequency of the pulse width signal.

19. The method of claim 17, wherein:

the pulse width signal is set in response to the comparison signal and is reset in response to the on-time signal.

20. The method of claim 17, wherein generating the on-time signal in response to the pulse width signal and the comparison signal comprises:

locking the rising edge of the comparison signal and the falling edge of the pulse width signal to generate a modulated signal; and adding the modulated signal to the current on-time signal to generate an update on-time signal.

* * * * *